United States Patent Office 3,585,069
Patented June 15, 1971

3,585,069
METHOD OF INHIBITING SULFIDE CRACKING WITH A REACTION PRODUCT OF B-HYDROXY BUTYRALDEHYDE AND HYDROGEN SULFIDE
Willliam D. Owsley, Duncan, Okla., assignor to Halliburton Company, Duncan, Okla.
No Drawing. Filed Dec. 6, 1967, Ser. No. 688,376
Int. Cl. C23f 7/24, 11/16
U.S. Cl. 117—127                    10 Claims

ABSTRACT OF THE DISCLOSURE

Inhibition of sulfide cracking and corrosion is obtained through the use of an inhibitor comprising the reaction product of an aldehyde and a hydrogen sulfide wherein the reaction product is deposited on the metal surface to be protected prior to exposure to corrosive medium.

BACKGROUND OF THE INVENTION

Metal surfaces are often subject to attack by hydrogen sulfide containing corrosive medium. In the oil well drilling industry, for example, hydrogen sulfide is a common contaminant found both in the well formation and in fluids removed from the well. Thus, metal surfaces used in drilling operations and in treating products from the well must be protected against attack by hydrogen sulfide.

In addition to normal corrosion, hydrogen sulfide also results in metal failure known as sulfide cracking. Sulfide cracking is not necessarily related to normal corrosion and may occur even in the absence of substantial oxidation, metal removal, etc. Sulfide cracking normally occurs in metal under a stress which may be either an applied stress or the residual stress due to, e.g., cold working. It has been found that normal corrosion inhibitors are often relametal is inhibited against normal corrosion. Thus, it has been found that normal corrosion inhibitors are often relatively ineffective in prevention of sulfide cracking.

In the copending application of Knox et al., Ser. No. 32,356 filed Apr. 22, 1970, a continuation in part of Ser. No. 615,323, filed Feb. 13, 1967 and now abandoned, it is disclosed that sulfide cracking is inhibited by the presence of a reaction product of hydrogen sulfide and an aldehyde. Although the inhibition afforded by this reactiton product is substantial and is better than inhibition which was previously obtainable, it is sometimes difficult to treat the corrosive fluid with an inhibitor and thus other methods of providing an inhibitor at the surface where cracking occurs are desired.

SUMMARY

The present invention is a method of providing a cracking inhibitor, comprising an aldehyde-hydrogen sulfide reaction product at the point where attack by the corrosive medium occurs by depositing the reaction product on the metal surface to be protected and preferably, in addition, curing at an elevated temperature.

It is, therefore, an object of the present invention to provide an inhibitor composition and a method of inhibiting corrosion in aqueous environments.

It is a further important object of this invention to provide an inhibitor composition and a method of inhibiting cracking in the presence of hydrogen sulfide.

These and other objects of the invention will become apparent from the discussion and example which follows.

Briefly, the present invention comprises the deposition of a coating of an inhibitor comprising the reaction product of an aldehyde and a hydrogen sulfide on the surface to be inhibited and then heating to cure the reaction product.

Beta-hydroxy butyraldehyde has been used in this invention. Thus, suitable aldehydes include alkyl aldehydes, aryl aldehydes and alkylaryl aldehydes. The aldehydes may be substituted with non-deleterious substituents such as a hydroxyl group. Suitable aldehydes include formaldehyde, benzaldehyde, butyraldehyde, β-hydroxy butyraldehyde (aldol), propionaldehyde, and glyoxal.

A convenient method of using formaldehyde is the use of a solution of formaldehyde in alcohol. For example, formaldehyde may be dissolved in an approximately equal amount of methanol. Other alcohols such as ethyl alcohol, propyl alcohol, butyl alcohol, and isobutyl alcohol may also be used. Solutions of formaldehyde in alcohol such as methyl Formcel (formaldehyde in methanol) are readily available commercially from the Celanese Chemical Company. Another convenient form of formaldehyde is paraformaldehyde, a solid polymer of formaldehyde.

In the present invention, hydrogen sulfide may be used as such or it may be obtained from a hydrogen sulfide source, e.g., FeS, or any other chemical that will react to release a hydrogen sulfide which can react with the aldehyde. A good source of hydrogen sulfide is thioacetamide. The aldehyde-hydrogen sulfide reaction product can be formed on the surface of the metal to be protected or can be formed separately and later applied to the surface. The reaction product is preferably formed by reacting the aldehyde with a hydrogen sulfide solution or a hydrogen sulfide source in a hydrochloric acid solution. The reaction can be carried out in an aqueous solution and the resulting product recovered as the precipitate. The solubility of the various products will vary. A satisfactory product is the reaction product of aldol with hydrogen sulfide. This product is very soluble in most of the common solvents such as methanol, ethanol, isopropanol, diacetone alcohol, acetone, etc.

The exact nature of the reaction product is not completely understood. However, it appears that at least a portion of the product is a trithioaldehyde. The trithioaldehyde formed from aldol can be represented by the following structure:

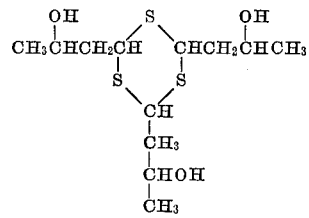

However, the invention is not limited to this structure but encompasses all of the reaction products which are obtained.

Application of the reaction product to the metal surface may be accomplished by forming a solution of the reaction product and then dipping, painting, etc. Additionally the reaction product may be applied as a liquid in the molten form. In general, any method of applying a thin uniform coating either in the liquid or solid state may be applied.

The coating may become damaged during storage, shipping or installation. If the coating is partially removed by scratching, it may be less effective in affording cracking protection. The damaged areas may be repaired by coating them with an aldehyde-hydrogen sulfide reaction product solution and heating to cure the coating. However, it may be inconvenient to carry out the curing step when the damage is noticed. For example, with equipment to be used in an oil well, it might be impractical to perform the cure at the well site. It has been found that damaged areas can be satisfactorily repaired by applying a coating of the aldehyde-hydrogen sulfide reaction product onto the damaged area. The coating may also contain a conventional corrosion inhibitor if desired.

The aldehyde-hydrogen sulfide reaction product formed on the surface of the metal to be protected is preferably heated at an elevated temperature in order to produce the exceptional cracking resistance obtained according to the present invention. Improvement in cracking resistance can be obtained by merely curing at room temperature. However, higher temperatures result in improved cracking resistance. Thus, curing should take place at room temperature or above. Better results are obtained by curing at a temperature above room temperature and preferably at a temperature of about 200° F. A temperature of above about 200° F. for about one hour will provide a metal surface having exceptional cracking resistance. Higher temperatures may be used but charring or decomposition of the coating due to the higher temperatures should be avoided. Of course, if longer curing times are used, the cure temperature need not be as high.

The invention may more readily be understood by reference to the following examples.

EXAMPLE 1

This example illustrates the effectiveness of the present invention in preventing hydrogen sulfide cracking. The tests were conducted by exposing C-rings to corrosive media. The rings, which were machined from 2 5/16 inch I.D. AISI 4140 carbon steel tubing, had an outside diameter of about 2.37 inches, a thickness of 0.15 inch and a width of about 0.25 inch. A 0.75 inch long section was cut out of the ring and at a point opposite this section a 45° notch, 0.023 inch deep, was made on the surface of the ring. Holes were drilled at points approximately equal distance from the removed section in the notch and a 1/8 inch bolt was inserted through the holes for the application of stress to the ring. The ring was stressed to 100% of the yield deformation which was determined at the point of linearity departure from load-deformation curves on C-rings of the same material. The tubing had been heat treated to a Rockwell (C) hardness of 36.

An aldehyde-hydrogen sulfide reaction product was obtained by adding 50 cc. of aldol to 300 cc. of 15% hydrochloric acid and saturating the resulting solution with hydrogen sulfide. The saturated solution was then placed in a 130° F. water bath for a period of one hour. It was then removed from the water bath and allowed to cool at room temperature. Upon cooling, a dark precipitate formed and collected in the bottom of the beaker. The largest portion of the solution was then decanted off and the remaining portion was filtered to collect the filtrate. The precipitate was then washed with 520 cc. portions of distilled water.

A solution was formed by dissolving 10% by weight of the aldehyde-hydrogen sulfide reaction product in 90% by weight methanol. The C-ring specimens were prestressed and immersed in the solution for one hour and then removed and allowed to cure for one hour at cure temperatures of room temperature (72° F.), 100° F., 150° F. and 200° F.

The C-rings that were cured at room temperature and 100° F. were placed in uninhibited 5% sour brine for a total immersion time of 14 days. The C-rings cured at 150° F. and 200° F. were placed in uninhibited 5% sour brine for 7 days followed by a 3-day kerosene rinse. There were no failures during the initial 7-day brine treatment or the kerosene rinse. The samples were then placed back into a 5% sour brine solution and time to failure was measured. The test was carried out at room temperature (72° F.). Hydrogen sulfide was bubbled through the brine solution every 24 hours to maintain saturation. The results are set forth below. Specimens 11 and 12 are controls which contained no coating.

TABLE I

| Specimen | Cure temperature, ° F. | Time to failure |
| --- | --- | --- |
| Number: | | |
| 1 | 72 | Intact after 14 days. |
| 2 | 72 | Failed between 3.5 and 18 hours. |
| 3 | 100 | Intact after 14 days. |
| 4 | 100 | Failed after 3.5 hours. |
| 5 | 150 | Failed after 11 days. |
| 6 | 150 | Failed after 12 days. |
| 7 | 200 | Failed after 17 days. |
| 8 | 200 | Failed after 109 days. |
| 9 | 200 | Failed after 139 days. |
| 10 | 200 | Failed after 107 days. |
| 11 | (1) | Failed after 3 hours. |
| 12 | (1) | Do. |

1 No coating.

The variation in results obtained with samples 1–4 is not fully understood. However, it may be that a more uniform coating is assured by treating at a high temperature which melts the aldehyde-hydrogen sulfide reaction product.

EXAMPLE 2

This example illustrates the importance of a completely uniform coating. The effect of damaging the coating was investigated by scratching a coated C-ring around the notched area with a knife. The test procedures were the same as Example 1 except that the trithioaldol was dissolved in 91.3% isopropyl alcohol by weight and cured at 200° F. for one hour. The results in Table II below show that damaging the coating by scratching with a knife did reduce the amount of cracking protection.

TABLE II

| Specimen | Coating condition | Time to failure |
| --- | --- | --- |
| Number: | | |
| 1 | Damaged | Failed between 5 and 8 days. |
| 2 | Intact | Intact after 14 days. |

The preceding examples are merely illustrative of the invention and should not be considered limiting as to its scope. Thus, a wide variety of reaction conditions can be made to form the aldehyde-hydrogen sulfide reaction product which may be formed from a variety of aldehydes. Also, improved cracking inhibition can be obtained both by increasing temperature and increasing cure time. The lawful scope of the present invention, therefore, should be limited only by the scope of the appended claims which follow.

I claim:
1. A method for inhibiting hydrogen sulfide cracking, which comprises the steps of:
    forming the reaction product of B-hydroxy butyraldehyde and hydrogen sulfide in the presence of an acid;
    dissolving the reaction product in a solvent to form a solution;
    coating the metal surface sought to be protected from hydrogen sulfide cracking with the solution; and
    curing the coating at a curing temperature in excess of about 150° F. to about 200° F. for a curing time of about one hour.
2. The method of claim 1 wherein the hydrogen sulfide is derived from a composition selected from the group consisting of compositions which will produce hydrogen sulfide in the presence of the acid.
3. The method of claim 1 wherein the hydrogen sulfide is derived from a composition selected from the group consisting of ferrous sulfide and thioacetamide.

4. The method of claim 1 wherein the hydrogen sulfide is derived from ferrous sulfide.

5. The method of claim 1 wherein the hydrogen sulfide is provided in its gaseous state.

6. The method of claim 1 wherein the acid is 15% hydrochloric acid.

7. The method of claim 1 wherein the solvent is selected from the group consisting of methanol, ethanol, propanol, diacetone alcohol, acetone, and water.

8. The method of claim 1 wherein the solvent is methanol, said methanol being present in a concentration of about 90% by weight.

9. The method of claim 1 wherein the curing temperature is about 200° F.

10. A metallic article inhibited against hydrogen sulfide cracking in accordance with the method of claim 1.

References Cited

UNITED STATES PATENTS

| | | | |
|---|---|---|---|
| 2,426,318 | 8/1947 | Menaul | 21—2.5X |
| 2,605,223 | 7/1952 | Case | 21—2.5X |
| 2,664,408 | 12/1953 | Plump et al. | 252—148X |

OTHER REFERENCES

"Corrosion," January 1970, vol. 26, No. 1, pp. 5, 7, and back cover.

RICHARD D. LOVERING, Primary Examiner

I. GLUCK, Assistant Examiner

U.S. Cl. X.R.

148—6.24; 208—47; 252—8.55E, 146, 392; 21—2.5